United States Patent
Berge et al.

(10) Patent No.: US 8,708,216 B2
(45) Date of Patent: Apr. 29, 2014

(54) REMOTE-CONTROLLED JOINING SYSTEM

(75) Inventors: Jan Olav Berge, Stavanger (NO); Richard Verley, Trondheim (NO); Michael Armstrong, Leeds (GB); Neil Woodward, Leeds (GB)

(73) Assignee: Statoil Petroleum AS, Stavanger (NO)

( * ) Notice: Subject to any disclaimer, the term of this patent is extended or adjusted under 35 U.S.C. 154(b) by 1127 days.

(21) Appl. No.: 11/631,533

(22) PCT Filed: Jul. 1, 2005

(86) PCT No.: PCT/NO2005/000248
§ 371 (c)(1),
(2), (4) Date: Nov. 2, 2007

(87) PCT Pub. No.: WO2006/004428
PCT Pub. Date: Jan. 12, 2006

(65) Prior Publication Data
US 2008/0142569 A1 Jun. 19, 2008

(30) Foreign Application Priority Data
Jul. 2, 2004 (NO) .................................. 20042799

(51) Int. Cl.
*B23K 1/00* (2006.01)
*B23K 1/18* (2006.01)
(52) U.S. Cl.
USPC ........ 228/49.3; 285/18; 138/155; 219/121.33
(58) Field of Classification Search
USPC ........ 228/49.3; 285/18; 138/155; 219/121.33
See application file for complete search history.

(56) References Cited

U.S. PATENT DOCUMENTS

| | | | | |
|---|---|---|---|---|
| 2,247,420 A * | 7/1941 | Sylvester | ........................ | 285/41 |
| 2,647,769 A * | 8/1953 | Smith | ........................ | 285/148.6 |
| 3,352,575 A * | 11/1967 | Daspit | ............................. | 285/45 |
| 3,986,728 A * | 10/1976 | Marsh | ............................. | 285/18 |
| 4,634,040 A * | 1/1987 | Savard | ........................ | 228/119 |
| 6,494,493 B1 * | 12/2002 | Baruh | ............................. | 285/31 |

FOREIGN PATENT DOCUMENTS

| | | |
|---|---|---|
| EP | 198789 A2 * | 10/1986 |
| WO | WO 9104826 A1 * | 4/1991 |

* cited by examiner

*Primary Examiner* — Erin Saad
(74) *Attorney, Agent, or Firm* — Wenderoth, Lind & Ponack, L.L.P.

(57) ABSTRACT

A remote-controlled joining system for subsea pipelines for joining two smooth pipeline ends (pipe ends) that are arranged facing in line a distance apart. The system includes an apparatus arranged to move at least one of the pipeline ends sideways and in the longitudinal direction. The joining system includes a pipe sleeve having internal seals for sealing against each pipeline surface. The pipe ends are inserted into the sleeve to a facing position within the seals. The system also includes a welding clamp with an integrated welding tool for remotely welding of a first end of the pipe sleeve to the first pipeline and a second end of the pipe sleeve to the second pipeline. The welding clamp can be remotely fastened sealingly around the pipe ends and the sleeve and is equipped with means for establishing and maintaining a welding atmosphere in a volume that is delimited by the seals of the clamp and the seals of the sleeve.

15 Claims, 8 Drawing Sheets

15- Pipe sleeve
16- Seals
17- Fillet welds
18- Pipe end
19- Spool end

Fig. 1

1- Service cassette.
2- Static clamp with seals to the pipe.
3- Welding cassettes (2 off).
4- Gas cassette.
5- ROV interface.
6- Rotating welding chamber.

7- Kevlar straps.
8- Guide post.

Fig. 4

9- Gripping arms for pipesleeve.
10- Cylinder to move pipesleeve.
11- Guide post interface

Fig. 5

12- Interface for torque tool.
13- Loos against pipe inner face.
14- Fitting brackets for buoyancy member

15- Pipe sleeve
16- Seals
17- Fillet welds
18- Pipe end
19- Spool end

REMOTE-CONTROLLED JOINING SYSTEM

BACKGROUND OF THE INVENTION

1. Field of the Invention

The present invention relates to joining, tie-in or fastening of pipelines subsea. More particularly, the present invention relates to joining of pipelines subsea, or tie-in of a pipeline subsea, by use of diverless welding. Diverless welding means in this context that there is no need for the aid of divers for preparation, installation of equipment, welding or demobilization of equipment. With the invention, a remote-controlled diverless joining system for subsea pipelines is provided.

2. Description of the Related Art

For the time being, joining of subsea pipelines very often requires work performed by divers. From 31 Dec. 2004 it is planned for Norwegian waters to limit the maximum allowable working depths for divers to 250 meters for emergency operations, up from the earlier limit of 360 meters. For pipelines having outer dimensions of 8" to 22" there are diverless systems for applying an external sleeve to connect pipelines that are to be joined. More particularly, MORGRIP 3000R mechanical coupling, which is installed without welding, is available from Hydrotight Sweeny Ltd., West Midlands, England. For pipelines of larger diameter it can often be possible to undertake the welding diverless, but divers must contribute by preparing and installing/demobilizing required equipment, such that the joining system overall is not diverless. In practice, there is no available technology for diverless joining of pipelines having dimensions of 28" and larger, such as dimensions up to 42" or even 48".

For pipelines on and from the Norwegian continental shelf the pipeline repair system PRS is usually utilized. The PRS system is available from the PRS-administration, Haugesund, Norway. The PRS system utilizes automated TIG-welding, but the equipment requires work by divers for installation.

A demand exists for equipment for completely diverless joining of pipelines at depths or more than 250 m for dimensions larger than 28". The objective of the present invention is to meet the demand.

The closest prior art to the present invention is constituted by the above-mentioned PRS system, and the above-mentioned MORGRIP-couplings. Relevant background art is described in the patent publications U.S. Pat. No. 6,131,801, NO-B-159,307, U.S. Pat. No. 5,437,517, GB-A-2323907, GB-A-2304394, NO-BI-304753, NO-BI-304954 and NO-B1-149288.

SUMMARY OF THE INVENTION

With the present invention the above-mentioned demand is met by providing a remote-controlled joining system for subsea pipelines for joining two smooth pipeline ends (pipe ends) that are arranged facing in line a distance apart, with means arranged to move at least one of the pipeline ends sideways and in the longitudinal direction. The joining system being distinguished in comprising:

a pipe sleeve having internal seals against each pipeline surface, for insertion of pipe ends to a facing position within the seals, and a welding clamp with integrated welding tool for remotely welding of a first end of the pipe sleeve to the first pipeline and a second end of the pipe sleeve to the second pipeline. The welding clamp can be remotely fastened sealingly around the pipe ends and the sleeve and is equipped with means for establishing and maintaining a welding atmosphere in a volume delimited by the seals of the clamp and the seals of the sleeve.

The pipe sleeve is preferably a cylindrical pipe piece, while the welds are to be considered as adaption and sealing elements between the pipe sleeve and the smooth pipe ends. The weld is dimensioned to be able to take up and transfer all stresses over the full life length as a result of internal and external loads, pressure and temperature fluctuations. Insertion of the pipe ends means that the pipe sleeve covers the pipe ends such that the pipe ends are facing within the internal seals in the pipe sleeve. Welding of each pipeline means fillet welding of the sleeve to the surface of the respective pipelines, each pipe end being inserted into the pipe sleeve to within a seal arranged for sealing against the respective pipeline surface.

Each pipeline can preferably be welded to one end of the pipe sleeve for each pipe end, which is preferable with respect to handling larger tolerances because the misfit can be distributed over more welds. All remote-controlled welding is preferably in the form of fillet welds, to accept larger tolerances and avoid fine machining of the pipe ends. A tolerance of up to about 5 mm can be accepted for each weld.

The clamp with integrated welding tool and means for gas atmosphere has preferably approximately neutral buoyancy in water, such that it relatively easily can be moved and placed by use of a remotely operable vehicle (ROV).

The welding tool is preferably equipped to undertake welding with a little over-pressure compared to the ambient pressure, such that ingress of damaging elements and gases, with respect to the quality of the weld, is limited. The gas is recovered and cleaned through a separate recovering module integrated with the welding clamp.

The means for welding includes preferably transport chains or transport rails that are internally disposed in the clamp, and the welding devices per se are preferably protected behind an integrated cover during transport and installation.

The welding devices per se includes preferably MIG welding equipment, and particularly preferred is manipulation of welding thread being fed through a feeding hose from the support module.

The system can appropriately be adapted for joining of pipelines of different dimensions.

The pipe sleeve can preferably be equipped with low pressure elastomer seals. The seals must be able to withstand the conditions during the welding operation, but they are only to take care of a relatively small differential pressure (<1 bar) to hinder ingress of water from the inside of the pipelines into the welding clamp.

The pipe sleeve is preferably equipped with markings and equipment for positioning and in addition means for cathodic protection, such as appropriate sacrificial anodes.

BRIEF DESCRIPTION OF THE DRAWINGS

The present invention is illustrated with a number of drawings, of which.

DETAILED DESCRIPTION OF THE INVENTION

Figure 1:
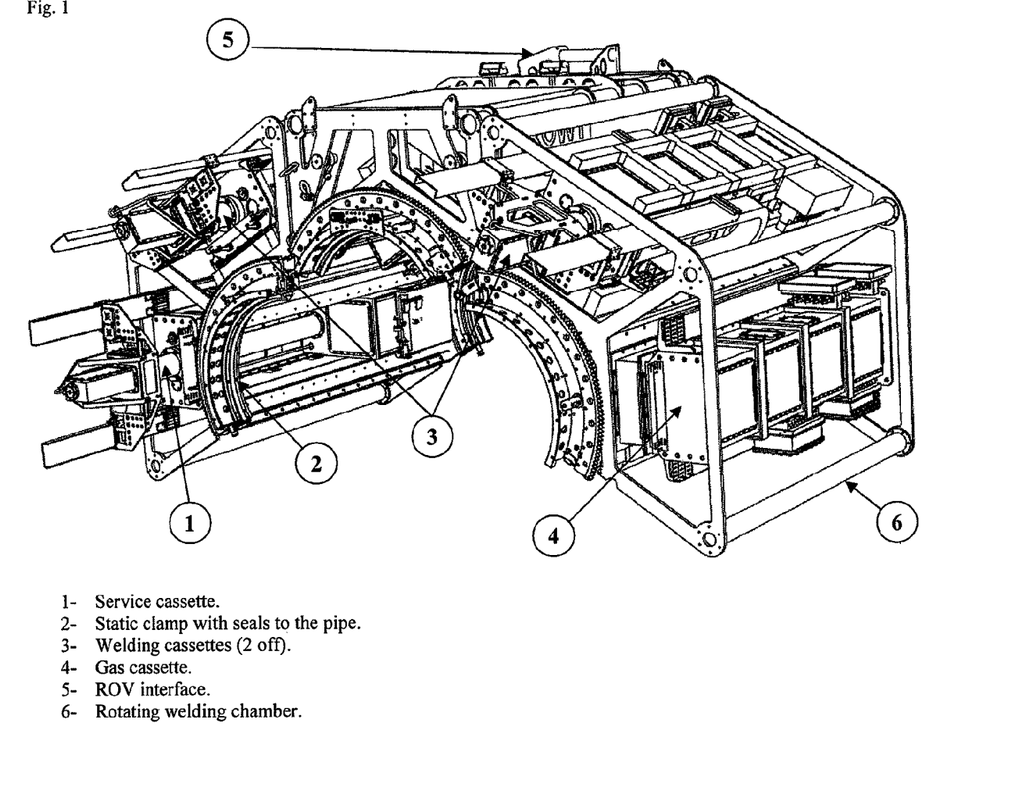
FIG. 1 is a perspective view of a welding clamp according to the present invention, formed as a clamp with integrated welding tool and means for providing a welding atmosphere.
Figure 2:
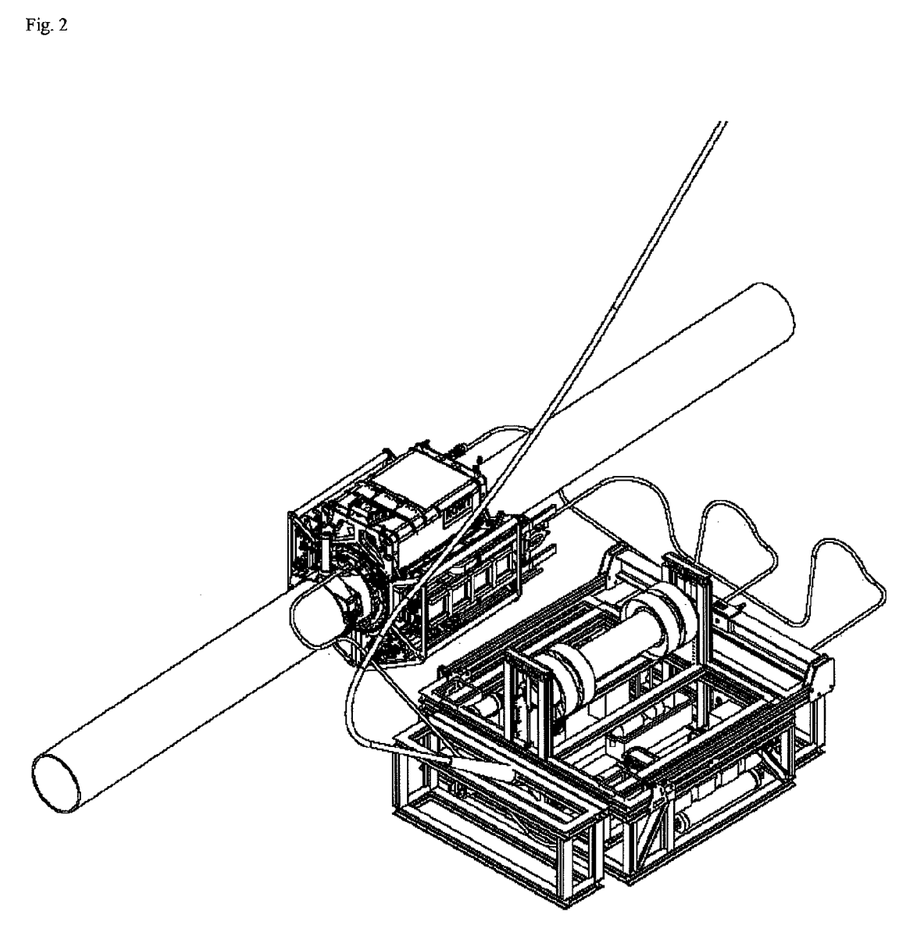
FIG. 2 is a perspective view of the welding support module that is used in connection with the invention.
Figure 8:
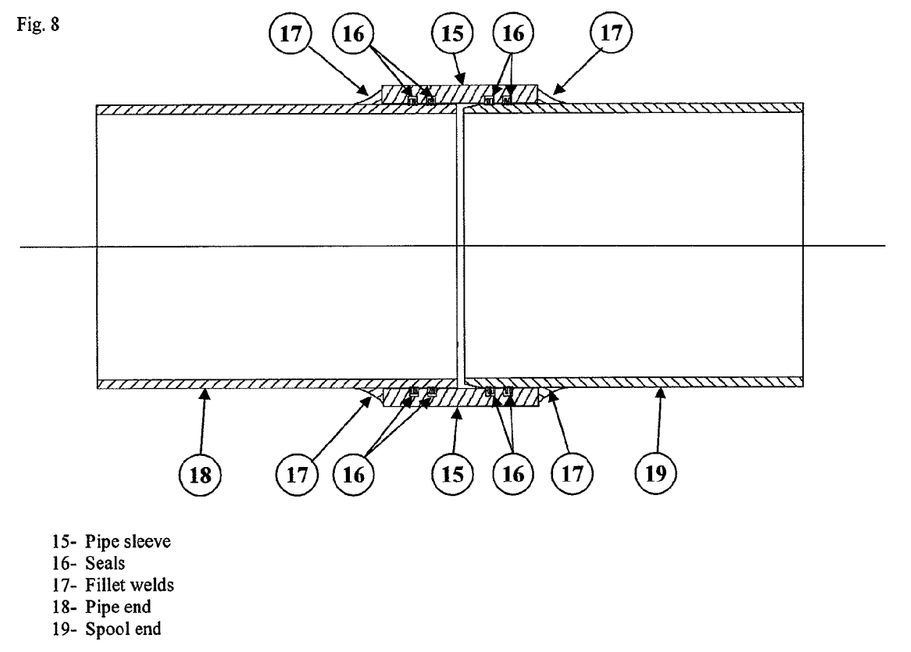
FIG. 8 is a perspective view of a pipe sleeve with fillet welds according to the present invention.

The invention will now be described further, and reference is first made to FIG. 8 that illustrates the pipe sleeve 15 with a fillet weld 17 in each end. In the figure, the pipe ends 18 on the pipelines 3 that shall be joined, are illustrated as being disposed within the sleeve 15. Between the pipe sleeve 15 and the pipe ends 18, seals 16 are arranged, with one seal around each pipe end such that the gap between the pipe end and pipe sleeve is closed. During a welding operation the seals 16 will seal against the water found in the water-filled pipelines. Each fillet weld 17 shall be welded between an outer surface of a pipe end 18 and the pipe sleeve 15, with one fillet weld at each end of the sleeve towards its respective pipeline. Before welding, the welding tool that is integrated into a clamp 2 is placed over the pipe sleeve, the seals of the clamp being arranged to seal against each designated pipeline, such that it can be possible to provide a dry space between the seals of the clamps and the seals on the inside of the pipe sleeve. The clamp 2 is illustrated on FIG. 1, and is constructed with approximately neutral buoyancy in water and with a frame for disconnectable handling by use of a remotely operated vehicle (ROV). In FIG. 1, not all features appear clearly, particularly not the welding tool. The clamp with integrated welding tool or cassettes 3 is connected to a welding support module that is illustrated in FIG. 2. By use of the welding support module and the clamp with the welding tool and the connection from the welding support module to a surface vessel, all power, welding thread, equipment for gas handling and other required equipment for the welding operation are provided. The gas system will be adapted for each situation, but will as a basis embodiment utilize a relatively inert gas at ambient pressure. The gas will be cleaned and dried in a dedicated gas-handling cassette 4, through which the gas volume circulates. The welding support module has a very negative buoyancy, while the clamp with integrated welding tool has approximately neutral buoyancy. Both units are preferably deployed together, such that the welding support module provides sufficient weight for deployment to the welding site, while the clamp with welding tool can be taken out and placed on site by use of an ROV.

Figure 3:
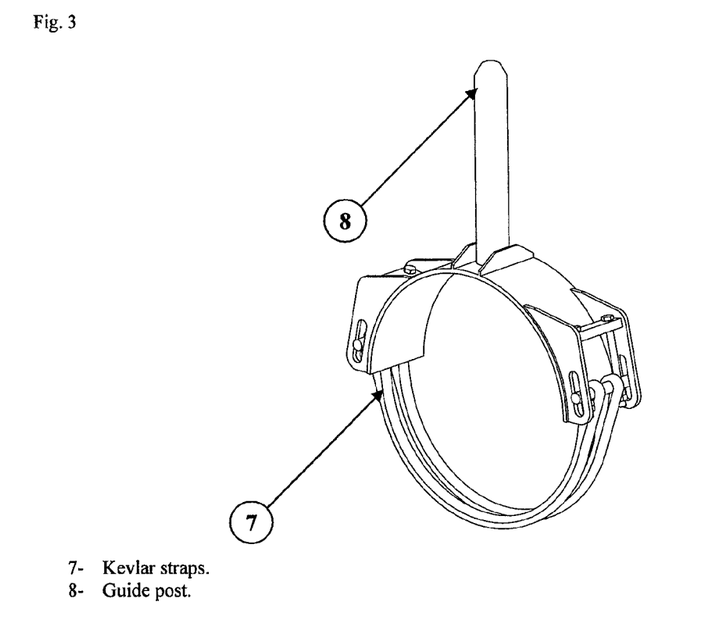
FIG. 3 is a perspective view of a reaction unit that is used with the present invention.

FIG. 3 illustrates one of several possible embodiments of a reaction unit functioning as a reaction point when the pipe sleeve is sliding on or off, in addition to functioning as a reference object when the welding tool in the clamp is to be installed on the pipe line. The illustrated reaction unit includes Kevlar straps 7 and a guide post 8. Normally the new pipe piece will have pipe sleeves mounted on to it before deployment into the sea.

Figure 4:
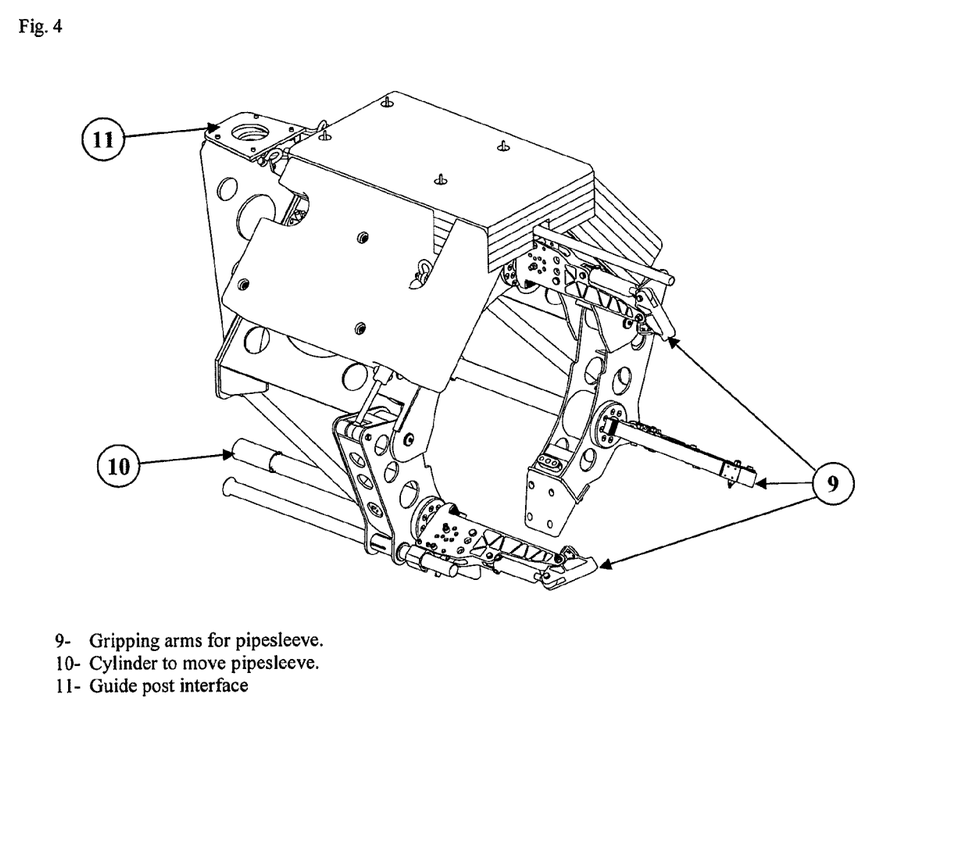
FIG. 4 is a perspective view of a jacking unit that is used in connection with the present invention.

FIG. 4 illustrates an embodiment of a jacking unit that is used to provide forces on the pipe sleeve in the longitudinal direction of the pipelines. As shown in FIG. 4, the jacking unit includes gripping arms 9 for gripping the pipe sleeve, a cylinder 10 to move the pipe sleeve, and a guide post interface 11.

Figure 5:
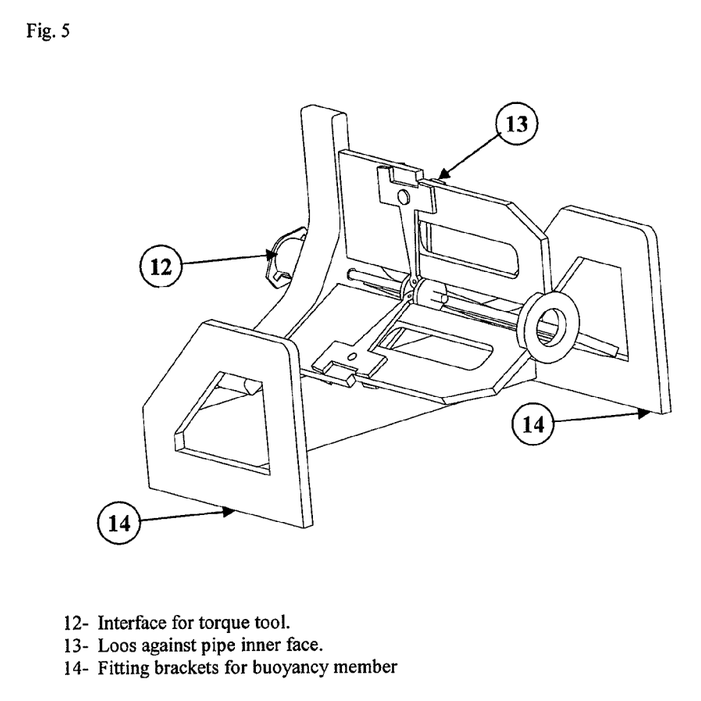
FIG. 5 is a perspective view of a handling unit that is used in connection with the present invention.

FIG. 5 illustrates a further handling unit that can be used to handle the pipe sleeve. As shown in FIG. 5, the handling unit includes an interface 12 for a torque tool, loos 13 against the pipe inner face, and fitting brackets 14 for a buoyancy member. 1

Figure 6:
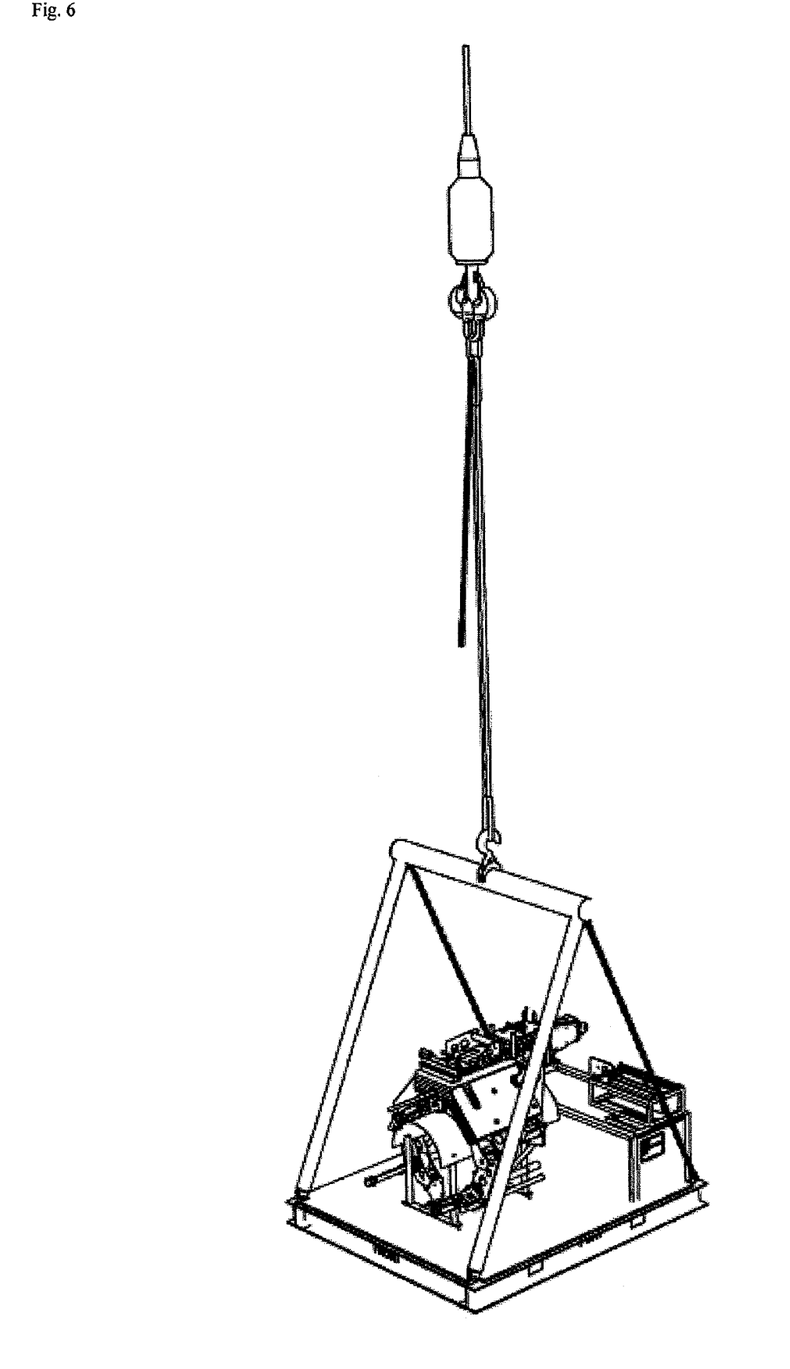
FIG. 6 is a perspective view of a support tool module that is used in connection with the present invention.

FIG. 6 illustrates a support tool module that in principle includes all further utility tools that are required in connection with the joining operation. This can be a large number of tools for preparation of the pipeline before the joining operation, video equipment, sensors and light, such tools in general are connected with short cables/hoses to the support tool module. An ROV is used to move or place the tools in position, while the operation is controlled from a surface vessel.

Figure 7:
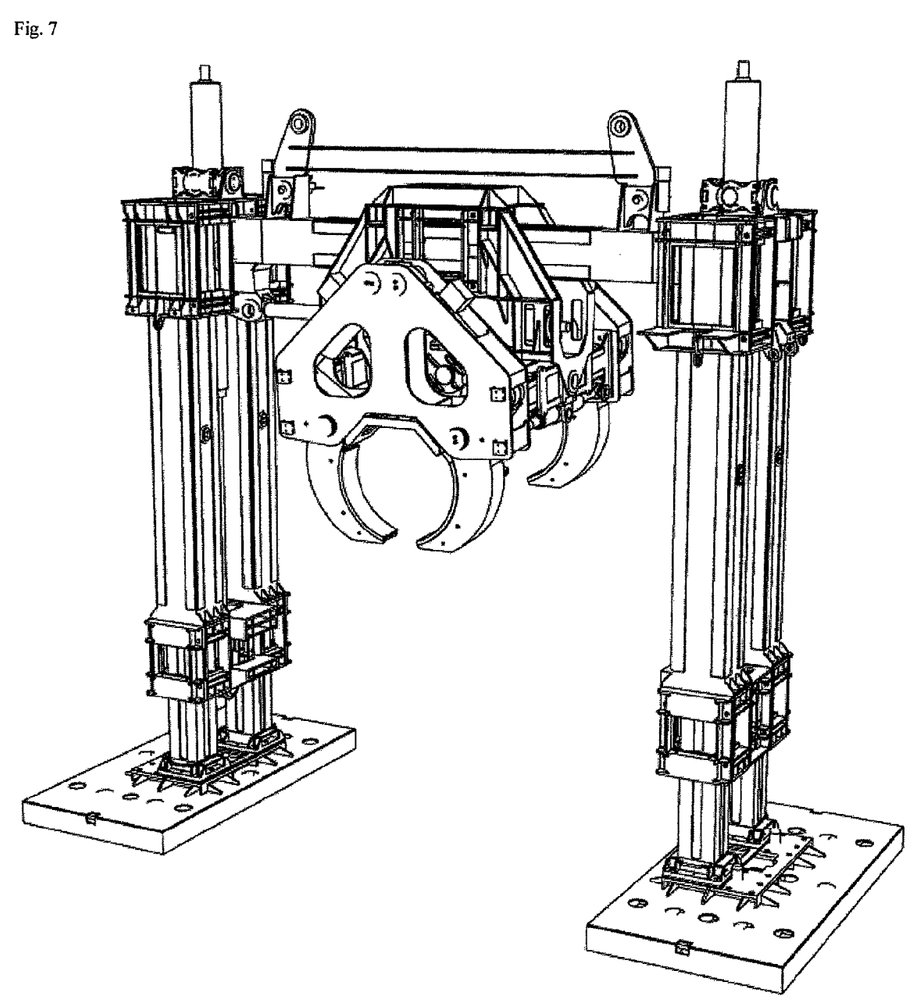
FIG. 7 is a perspective view of one of several different pipe handling frames that can be used in connection with the present invention.

FIG. 7 illustrates an example on a pipe handling frame used to lift up the pipeline from the seabed, to provide access for preparation and aligning of the two pipeline ends.

Most of the above-mentioned equipment are previously known. The distinguishing features of the present invention are the pipe sleeve with seals, and the welding tool that is integrated into a clamp with means for sealingly fastening around the pipe sleeve and means for establishing and maintaining a welding atmosphere in a dry volume that is limited by the seals of the clamps and the seals of the pipe sleeve.

The joining system according to the present invention can be used for joining of pipelines, or for repair of pipelines by cutting off a damaged part of the pipelines, and the joining system can be used to join the ends. Before the joining operation per se is commenced, a comprehensive work has to be undertaken to inspect the area of the operation to clarify details with respect to the extent of the operation and how it shall be undertaken. The pipeline must optionally be loosened from the ground and lifted into position, the surfaces must be cleaned smooth and, if required, the pipeline or the ends must be cut after filling of the pipeline with water. All preparation work can be undertaken with previously known equipment, for example equipment available in the previously mentioned Pipeline Repair System (PRS). The pipe ends are adjusted to be located at an appropriate distance relative to the pipe sleeve that is to be used, and preferably a slight curvature in the pipeline is provided, to take up expected compression after welding, such that the joining areas as lowered down to the seabed is without large welding stresses. Before lowering the welding equipment, the pipe sleeve is preferably marked and clarified as much as possible, for example on a surface vessel. This includes marking, positioning and if appropriate welding of the pipe sleeve on one end. It is, however, considered possible to install all the above mentioned units remotely from the surface, but this is relatively complicated and laborious process.

On the pipe handling frames and on the reaction unit transponders are installed, to be used for establishing a base line for the installation. The pipe sleeve can most easily be installed on the pipeline by moving one first pipeline end out from the base line, the pipe sleeve is inserted onto one pipe end, after which the first pipe end is moved back to the base line and the pipe sleeve is moved to the correct position. When the pipe sleeve is correctly positioned by use of the earlier mentioned equipment and further instrumentation, with the pipe ends within the seals in the pipe sleeve, and optional activation of the seals have been done, the preparations for welding can start. An ROV is used to place the welding clamp onto the pipeline and over the pipe sleeve, such that the clamp can be locked hydraulically and thereby encompass the pipe sleeve. It is preferable to arrange equipment to test the function of the seals, for example by use of a pressure test of the volume that is to be evacuated for seawater. The welding atmosphere is established by using an appropriate gas to displace the seawater in the volume where welding shall take place. The welding atmosphere is preferably such that relative low partial pressure of humidity and damaging gases can be achieved and maintained, which is qualified for each situation. After undertaking acceptable welding, the equipment can be demobilized in substance in an opposite direction of the installation. The pipe ends are left joined by use of a joining welding of the pipe sleeve that is welded to the pipelines with a relatively large fillet weld to each pipeline. The exposed areas on the pipeline are left with appropriate cathodic protection, which preferably can be provided by sacrificial anodes integrated into the pipe sleeve.

The invention claimed is:

1. A system for remotely controlled subsea joining of an end of a first pipeline and an end of a second pipeline, the first pipeline and the second pipeline being aligned and laterally separated, the system comprising:
   an arrangement for moving the end of the first pipeline toward the end of the second pipeline;
   a pipe sleeve having a first end, a second end, and internal seals for bearing against an outer surface of each of the first pipeline and the second pipeline when the end of the first pipeline and the end of the second pipeline are located in a mutually facing position within said internal seals; and
   a welding clamp having seals and an integrated welding tool for remotely welding said first end of said pipe sleeve to the first pipeline and for remotely welding said second end of said pipe sleeve to the second pipeline,
   wherein said welding clamp can be remotely fastened in a sealing engagement around the end of the first pipeline and the end of the second pipeline such that a welding atmosphere can be established and maintained in a volume delimited by said seals of said welding clamp and said internal seals of said pipe sleeve.

2. The system of claim 1, wherein said first end of said pipe sleeve and said second end of said pipe sleeve are welded to the first pipeline and the second pipeline, respectively, with a fillet weld.

3. The system of claim 1, wherein said integrated welding tool makes fillet welds.

4. The system of claim 1, wherein said welding clamp has approximately neutral buoyancy in water when said welding clamp is fastened around the end of the first pipeline and the end of the second pipeline and the welding atmosphere is established, and
   wherein said welding clamp can be moved and placed using a remotely operated vehicle.

5. The system of claim 1, wherein said integrated welding tool is equipped to effect welding with an overpressure relative to ambient pressure.

6. The system of claim 1, wherein said integrated welding tool includes internal transport chains or transport rails, and further includes a protective, integrated cover for use during transport and installation.

7. The system of claim 1, wherein said integrated welding tool includes MIG-welding equipment with tungsten inert gas electrodes.

8. The system of claim 1, wherein said integrated welding tool includes a welding head, and is configured such that manipulation of said welding head is integrated with manipulation of welding thread.

9. The system of claim 1, wherein said welding clamp is adaptable for joining pipelines of different dimensions.

10. The system of claim 1, wherein said internal seals of said pipe sleeve are passive seals for bearing against the outer surfaces of the first pipeline and the second pipeline.

11. The system of claim 1, wherein said pipe sleeve includes markings and equipment for positioning.

12. The system of claim 1, wherein said pipe sleeve is equipped with devices for cathodic protection.

13. The system of claim 1, wherein said integrated welding tool produces welds dimensioned with a tolerance up to 5 mm.

14. The system of claim 1, wherein said internal seals of said pipe sleeve are elastomer seals.

15. The system of claim 1, wherein said internal seals of said pipe sleeve are elastomer seals disposed in a recess formed in said pipe sleeve, and
   wherein said welding clamp welds said pipe sleeve directly to the first pipeline and the second pipeline on either side of said elastomer seals.

* * * * *